US011840935B2

(12) United States Patent
Bin et al.

(10) Patent No.: US 11,840,935 B2
(45) Date of Patent: Dec. 12, 2023

(54) METHOD AND SYSTEM FOR CONTROLLING VIBRATION OF ROTOR IN TURBOSHAFT ENGINE

(71) Applicant: Hunan University of Science and Technology, Hunan (CN)

(72) Inventors: Guangfu Bin, Hunan (CN); Chao Li, Hunan (CN); Qingxiong Lu, Hunan (CN); Yangyan Zhang, Hunan (CN); Jian Li, Hunan (CN); Huiyu Xu, Hunan (CN); Weimin Wang, Hunan (CN); Pingping Yang, Hunan (CN)

(73) Assignee: Hunan University of Science and Technology, Hunan (CN)

( * ) Notice: Subject to any disclaimer, the term of this patent is extended or adjusted under 35 U.S.C. 154(b) by 0 days.

(21) Appl. No.: 17/879,936

(22) Filed: Aug. 3, 2022

(65) Prior Publication Data
US 2023/0366328 A1 Nov. 16, 2023

(30) Foreign Application Priority Data

May 12, 2022 (CN) .......................... 202210516716.1

(51) Int. Cl.
*B64D 31/00* (2006.01)
*F01D 25/16* (2006.01)
*B64D 31/06* (2006.01)

(52) U.S. Cl.
CPC ........... *F01D 25/164* (2013.01); *B64D 31/00* (2013.01); *B64D 31/06* (2013.01); *F05D 2260/96* (2013.01)

(58) Field of Classification Search
CPC ... F01D 25/164; F05D 2260/96; B64D 31/00; B64D 31/06
USPC ........................................................ 701/100
See application file for complete search history.

(56) References Cited

U.S. PATENT DOCUMENTS

| | | | |
|---|---|---|---|
| 2001/0009592 A1* | 7/2001 | Maquire ............... | F16C 27/045 384/99 |
| 2005/0271499 A1* | 12/2005 | Loy ......................... | F01D 25/04 415/1 |
| 2009/0110572 A1* | 4/2009 | Meacham ............. | F16C 19/184 417/406 |
| 2019/0234458 A1* | 8/2019 | Taguchi .................. | F16C 19/06 |

* cited by examiner

*Primary Examiner* — Steven M Sutherland
(74) *Attorney, Agent, or Firm* — Neugeboren O'Dowd PC (57) ABSTRACT

A method and system for controlling a vibration of a rotor in a turboshaft engine are provided. The method includes: establishing, based on a kinetic model for a rotor-casing system, a mapping matrix indicating a correspondence among an unbalance, an oil film clearance, and a vibration response; performing determination on a real-time vibration response, and skipping adjustment if the real-time vibration response is smaller than a response threshold; otherwise, approximately matching a real-time oil film clearance and the real-time vibration response with the mapping matrix to obtain a real-time unbalance; obtaining, based on the real-time unbalance and the mapping matrix, a preferred vibration response, and further obtaining a preferred oil film clearance; based on the preferred oil film clearance and the real-time oil film clearance, obtaining a clearance adjustment amount; generating a control signal based on the clearance adjustment amount, and performing adjustment based on the control signal.

20 Claims, 7 Drawing Sheets

METHOD AND SYSTEM FOR CONTROLLING VIBRATION OF ROTOR IN TURBOSHAFT ENGINE

CROSS REFERENCE TO RELATED APPLICATION

This patent application claims the benefit and priority of Chinese Patent Application No. 202210516716.1, entitled "METHOD AND SYSTEM FOR CONTROLLING VIBRATION OF ROTOR IN TURBOSHAFT ENGINE" filed on May 12, 2022, the disclosure of which is incorporated by reference herein in its entirety as part of the present application.

TECHNICAL FIELD

The present disclosure relates to the technical field of engine vibration control, and in particular, to a method and system for controlling vibration of a rotor in a turboshaft engine.

BACKGROUND ART

In order to meet maneuver demands of a helicopter for a variable working condition, a gas generator rotor of a turboshaft engine usually has an operating rotational speed ranging from 35000 r/min to 50000 r/min. However, a vibration response produced within this range of the operating rotational speed has a great amplitude, which may severely damage the rotor. In addition, anisotropy of some materials of each structure, processing and manufacturing, assembly errors, and blade damage in operation will cause an unbalance fault of the rotor, resulting in excessive vibration of a system and thus endangering safety of a assembling unit, and in serious cases, causing the assembling unit to shut down or even a major accident of a fatal crash.

Currently, a squeeze film damper (SFD) is usually used to attenuate a vibration of the rotor. The squeeze film damper has advantages of simple structure, small space occupation and remarkable damping effect. However, due to highly nonlinear oil film stiffness and damping, when rotor eccentricity exceeds a limit, such phenomena as bistable state, dead lock and uncoordinated precession are very likely to occur, which causes the vibration of the rotor to rise rather than fall. An uncontrollable oil film clearance of a traditional squeeze film damper makes it difficult to adapt to complex working conditions.

To address this issue, a vibration control method for adjusting oil film clearance by an external damping is developed spontaneously. For example, vibration attenuation is realized by adjusting the oil film clearance of the squeeze film damper with a hydraulic adjusting screw, or by adjusting a tapered damping chamber to adjust oil film radius clearance. However, the above two techniques have the following problems: 1) a manner of using the hydraulic adjusting screw is inflexible and it is difficult to respond quickly to problems of the vibration of the rotor, which greatly limits the damping effect of the damper; and 2) the damper is poor in adjustment accuracy, and cannot yield a significant damping effect.

SUMMARY

In view of this, the present disclosure provides a method and system for controlling a vibration of a rotor in a turboshaft engine, which achieve quick and real-time response according to real-time demands of rotor imbalance, and resolve problems of a traditional squeeze film damper such as uncontrollability or inflexibility in oil film clearance regulation, difficulty in adapting to a complex working condition, slow response, and low control accuracy.

In order to achieve the above effects, the present disclosure provides the following technical solutions.

A method for controlling a vibration of a rotor in a turboshaft engine, includes:
establishing, based on a kinetic model for a rotor-casing system, a mapping matrix indicating a correspondence among an unbalance, an oil film clearance, and a vibration response;
acquiring a real-time oil film clearance and a real-time vibration response; performing determination on the real-time vibration response, under a condition that the real-time vibration response is smaller than a response threshold, skipping adjustment; under a condition that the real-time vibration response is greater than or equal to the response threshold, approximately matching the real-time oil film clearance and the real-time vibration response with the mapping matrix to obtain a real-time unbalance;
obtaining, based on the real-time unbalance and the mapping matrix, a preferred vibration response, and further obtaining a preferred oil film clearance; and
obtaining, based on the preferred oil film clearance and the real-time oil film clearance, a clearance adjustment amount; and generating a control signal based on the clearance adjustment amount, and performing adjustment based on the control signal.

In an embodiment, establishing, based on the kinetic model for the rotor-casing system, the mapping matrix indicating the correspondence among the unbalance, the oil film clearance, and the vibration response specifically includes:
establishing the kinetic model for the rotor-casing system; virtually embedding a plurality of unbalances in the kinetic model for the rotor-casing system, setting a plurality of oil film clearances under each of the unbalances, and performing a response analysis to obtain the mapping matrix.

In an embodiment, obtaining, based on the real-time unbalance and the mapping matrix, the preferred vibration response, and further obtaining the preferred oil film clearance specifically includes:
searching the mapping matrix for a plurality of initial vibration responses smaller than the response threshold based on the real-time unbalance, and randomly selecting one of the plurality of initial vibration responses as the preferred vibration response; and
searching the mapping matrix based on the real-time unbalance and the preferred vibration response for the preferred oil film clearance.

In an embodiment, obtaining, based on the preferred oil film clearance and the real-time oil film clearance, the clearance adjustment amount; and generating the control signal based on the clearance adjustment amount, and performing the adjustment based on the control signal includes:
solving a difference between the preferred oil film clearance and the real-time oil film clearance to obtain the clearance adjustment amount; and
generating the control signal based on the clearance adjustment amount, and performing the adjustment based on the control signal.

In an embodiment, generating the control signal based on the clearance adjustment amount, and performing the adjustment based on the control signal specifically includes:
- taking a difference value between the clearance adjustment amount and a sensing value of a piezoelectric stack displacement sensor as an input value of a PID controller to obtain an initial control signal;
- optimizing the initial control signal based on a neural network to obtain the control signal; and
- driving an oil film damping device to adjust the oil film clearance based on the control signal.

The present disclosure further provides a system for controlling a vibration of a rotor in a turboshaft engine, applicable to the method described above, where the system includes:
- an acquisition module configured to acquire a real-time oil film clearance and a real-time vibration response;
- a control module configured to generate a control signal based on the real-time oil film clearance, the real-time vibration response, and a mapping matrix; and
- an oil film damping device configured to conduct, based on the control signal, radial displacement to adjust an oil film clearance.

In an embodiment, the oil film damping device includes:
- a split bearing bush arranged outside a squirrel cage, where the oil film clearance is formed between the split bearing bush and the squirrel cage; and
- a plurality of piezoelectric ceramic actuators, where an end of each piezoelectric ceramic actuator is connected with an outer wall of a bearing seat, and another end of the piezoelectric ceramic actuator is connected with the split bearing bush; and each of the piezoelectric ceramic actuators conducts radial motion based on the control signal to drive the split bearing bush to conduct radial motion, thereby adjusting the oil film clearance.

In an embodiment, each of the piezoelectric ceramic actuators is connected with the split bearing bush via an O-shaped seal ring.

In an embodiment, the squirrel cage is further provided with a stop end; and
- the stop end, under a constraint condition of not limiting the radial motion of the split bearing bush, is arranged on both sides of the split bearing bush.

According to the specific embodiments provided by the present disclosure, the present disclosure provides the following technical effects:

According to the present disclosure, the mapping matrix containing the unbalance, the oil film clearance and the vibration response is established, and an approximate value may be matched in the mapping matrix after measuring the oil film clearance and the vibration response, thereby determining the corresponding unbalance and finding the vibration response that is less than the response threshold. At this time, the oil film clearance is a target oil film clearance. With a characteristic of a high displacement resolution of the piezoelectric ceramic actuator, the present disclosure may, under control of the neural network and a proportional, integral and derivative (PID) controller, achieve precise control, and allow for adaptability to complex working conditions.

Aiming at a problem of a sudden change of vibration amplitude of the rotor-casing system, the present disclosure adopts the piezoelectric ceramic actuator which is featured by quick response, to drive the split bearing bush to quickly adjust the oil film clearance, thereby controlling the vibration of the rotor.

BRIEF DESCRIPTION OF THE DRAWINGS

To describe the embodiments of the present disclosure or the technical solutions in the related art more clearly, the accompanying drawings will be described briefly. Obviously, the accompanying drawings described below are only some embodiments of the present disclosure. Those skilled in the art may further extrapolate or imply other accompanying drawings from these drawings without creative efforts.

Reference numerals: 1. acquisition module; 2. control module; 3. oil film damping device; 4. squirrel cage; 5. oil film; 6. bearing seat; 7. rolling bearing; 8. rotary shaft; 31. split bearing bush; 32. piezoelectric ceramic actuator; 33. O-shaped seal ring; 34. stop end; 341. left stop end; and 342. right stop end.

DETAILED DESCRIPTION OF THE EMBODIMENTS

The technical solutions of the embodiments of the present disclosure will be clearly and completely described below with reference to the accompanying drawings in the embodiments of the present disclosure. Obviously, the described embodiments are merely a part rather than all of the embodiments of the present disclosure. Based on the embodiments of the present disclosure, all other embodiments obtained by those skilled in the art without creative efforts or undue experimentation shall fall within the scope of the present disclosure.

The disclosure intends to provide a method and system for controlling a vibration of a rotor in a turboshaft engine, which achieves a quick and real-time response according to real-time demands of rotor imbalance, and resolves problems of a traditional squeeze film damper such as uncontrollability or inflexibility in oil film clearance regulation, difficulty in adapting to a complex working condition, slow response, and low control accuracy.

For a better understanding of the intention, features, and advantages of the present disclosure, the disclosure will be further described in detail below in conjunction with the accompanying drawings and specific embodiments thereof.

Figure 1:
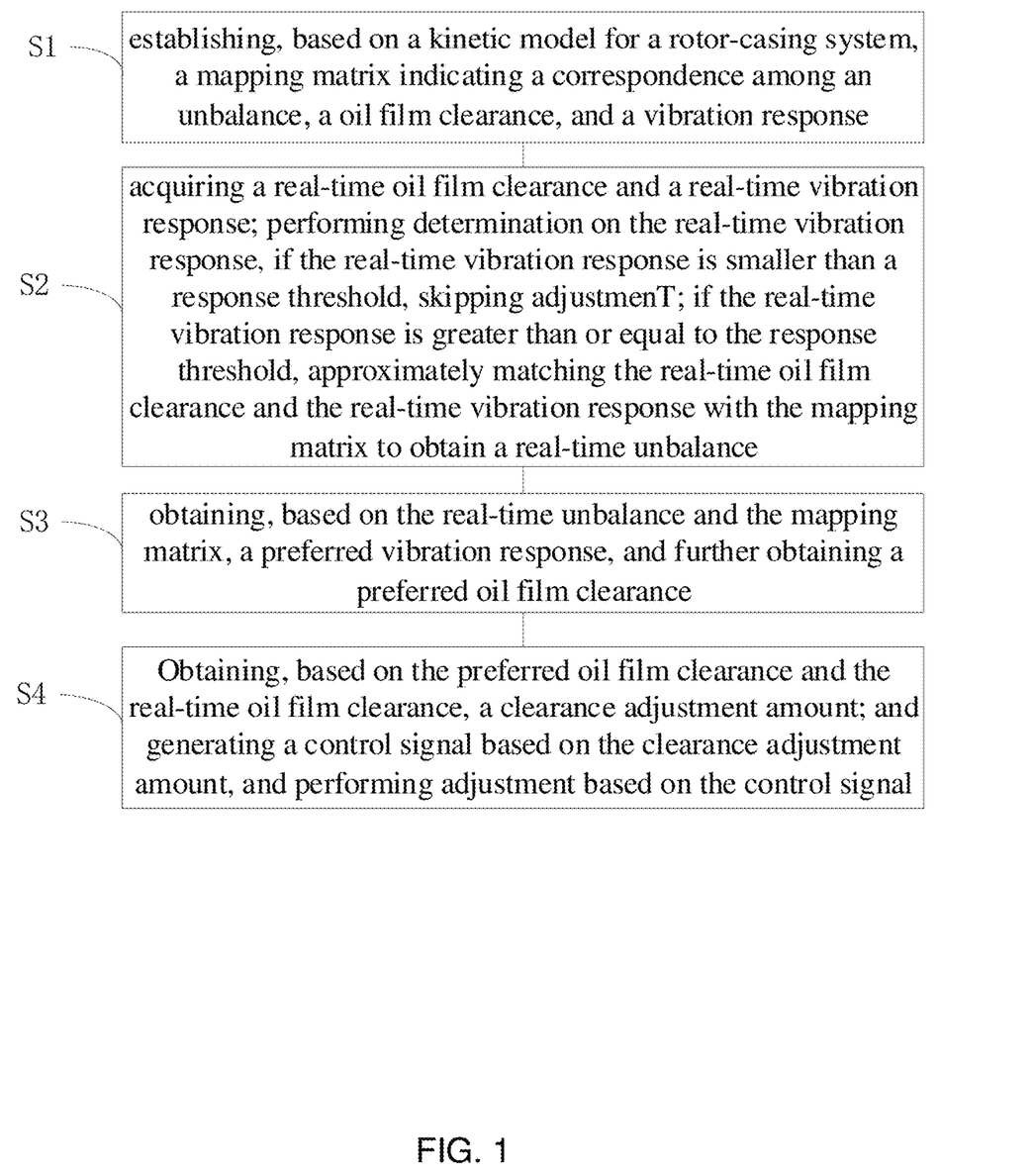
FIG. 1 is a flowchart illustrating a method for controlling a vibration of a rotor in a turboshaft engine according to the present disclosure.

FIG. 1 is a flowchart illustrating a method for controlling the vibration of a rotor in a turboshaft engine. As shown in FIG. 1, the present disclosure provides the method for controlling the vibration of the rotor in the turboshaft engine, including steps S1-S4.

Step S1: based on a kinetic model for a rotor-casing system, a mapping matrix indicating a correspondence among an unbalance, an oil film clearance, and a vibration response is established.

Specifically, firstly the kinetic model for the rotor-casing system is established; a plurality of unbalances are virtually embedded in the kinetic model for the rotor-casing system, a plurality of oil film clearances are set under each of the unbalances, and a response analysis is performed to obtain the mapping matrix.

The kinetic model for the rotor-casing kinetic model is implanted with unbalances, and different oil film clearances are set by simulating a large amount of simulation data in advance, and then a vibration response analysis is performed to obtain different vibration responses, and thus the mapping matrix among the unbalances, the oil film clearances and the vibration responses is established.

A differential equation regarding motion of the rotor-casing system is $M\ddot{q}+C\dot{q}+Kg=\Sigma F_i$;

where q denotes a displacement of the rotor-casing system; $\ddot{q}$ denotes taking a derivative of $\dot{q}$; $\dot{q}$ denotes taking a derivative of q; M denotes a mass matrix of the rotor-casing system; C denotes a damping matrix, which mainly covers damping of a squeeze film damper (SFD); K denotes a rigidity matrix; $F_i$ denotes the $i^{th}$ unbalanced force, which is expressed as $$F_i = \begin{bmatrix} F_{ix} \\ F_{iy} \end{bmatrix} = \begin{bmatrix} m_i e_i \omega^2 \cos(\omega t + \theta_i) \\ m_i e_i \omega^2 \sin(\omega t + \theta_i) \end{bmatrix},$$

where $m_i$ denotes mass of the $i^{th}$ leaf disc; $e_i$ denotes a distance from an unbalanced mass on the $i^{th}$ leaf disc to a center of rotation thereof; ω denotes a rotational speed of the rotor; $\theta_i$ denotes an initial phase of the unbalanced mass on the $i^{th}$ leaf disc; and i=1, 2, 3, . . . , N, denote a position of the leaf disc, where N denotes the number of the leaf discs, and t denotes time.

Figure 2:
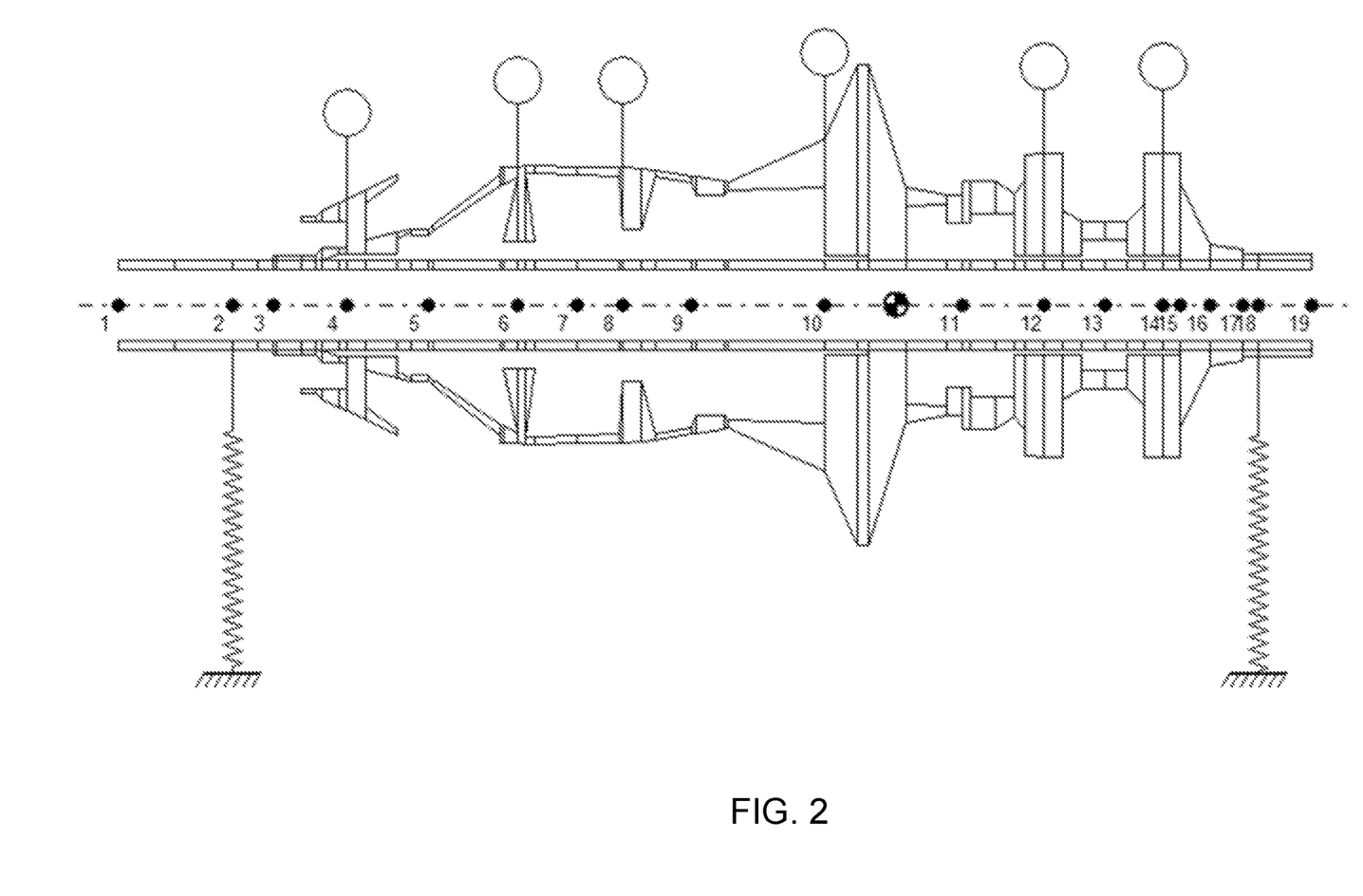
FIG. 2 is a structural diagram of a rotor-casing kinetic model according to the present disclosure.

Based on the differential equation regarding motion of the rotor-casing system, digital model reconstruction is conducted on a casing by combining reverse engineering and forward modeling. With a combination of a weight-variable non-uniform meshing method, a finite element model of the casing can be constructed by DyRoBeS software. SFD modeling and simulation are performed with computational fluid dynamics to obtain an equivalent damping value varying with the rotational speed. A full three-dimensional finite element model of a squirrel cage with local geometric characteristics is established by using DyRoBeS software. The kinetic model for the rotor-casing system is constructed according to an equivalence principle of kinetic characteristics. A rotor-casing system-casing modal experiment is completed by using a hammering pulse excitation method. A system frequency-response function is obtained from excitation force at a blade of a gas generator rotor and a vibration response signal of a casing measuring point. Kinetic parameter identification is completed based on a response surface method. And by combining the kinetic parameter identification of a modal experiment, modeling parameters and boundary conditions of the kinetic model for the rotor-casing system are modified. The kinetic model for the rotor-casing system is shown in FIG. 2.

Figure 3:
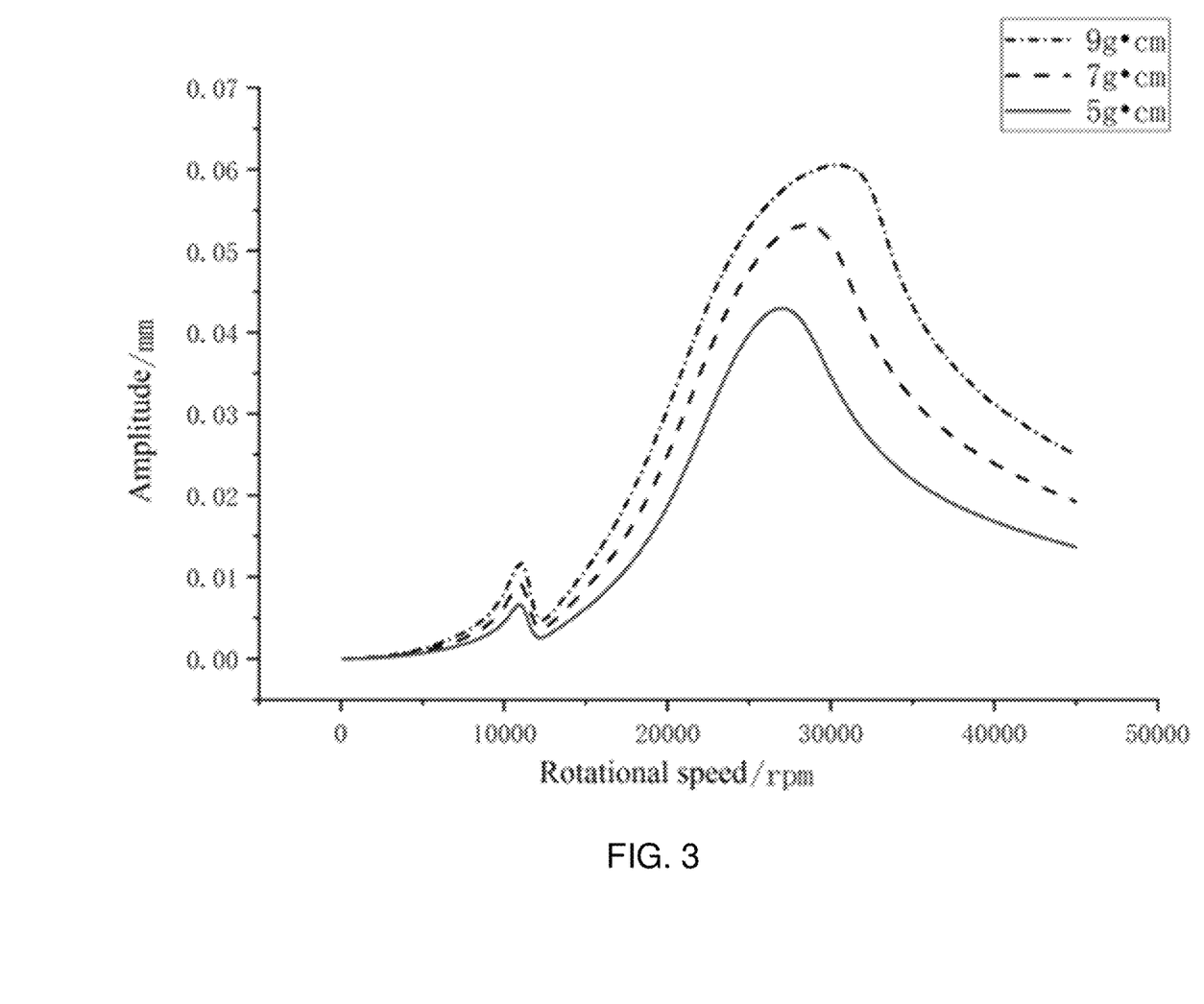
FIG. 3 is a schematic diagram illustrating effects of different unbalances on a vibration response of a rotor-casing system.
Figure 4:
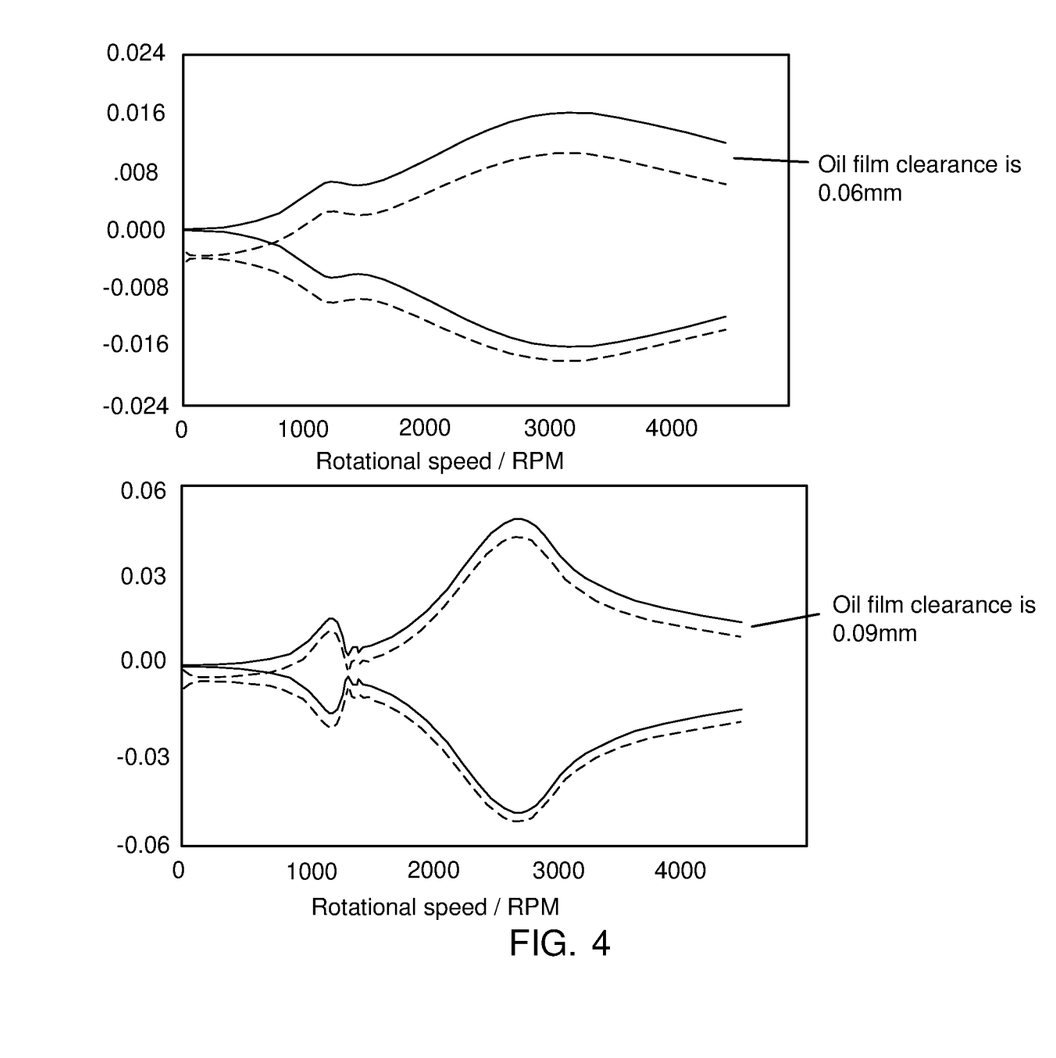
FIG. 4 is a schematic diagram illustrating an effect of different oil film clearances on the vibration response of the rotor-casing system.

Based on the kinetic model for the rotor-casing system containing the oil film clearance established by DyRoBeS software, unbalances are input to the kinetic model for the rotor-casing system. An unbalance $U_i$(i=1, 2, . . . k) is virtually embedded, where k denotes the number of the unbalances, and can be set to be 10. The oil film clearance $C_j$(j=1, 2, . . . r) is set under each of the unbalances, where $C_j$ is taken within an adjustable range of the oil film clearance, and r denotes the number of the oil film clearances. According to a specification for design value of the oil film clearance of the squeeze film damper as set forth in the Aeroengine Design Manual, the oil film clearance which accounts for 1-5% of a journal radius can allow for a good damping effect. It is generally acknowledged that the rotor-casing system may be unstable when the oil film clearance is lower than the lower limit, and a vibration damping effect cannot be exerted when the oil film clearance is higher than the upper limit. In this embodiment, 3% is taken, that is, the adjustable range of the oil film clearance is 1-3%. It is assumed r=10 to observe the vibration response. Therefore, when each unbalance is kept constant, a corresponding vibration response $R_j^i$ is produced once one oil film clearance is set, thus a mapping submatrix A2 of the oil film clearance and the vibration response is established under a certain unbalance. One correspondence is ($C_j$, $R_j^i$). The unbalance size is changed, previous operations of setting different oil film clearances, observing the vibration response and establishing the mapping matrix are repeated. Therefore, for each unbalance, setting one oil film clearance yields one corresponding vibration response. FIG. 3 shows analysis of the effect of different unbalances on the vibration response of the rotor-casing system. FIG. 4 shows the effect of different oil film clearances on the vibration response of the rotor-casing system. A mapping matrix A1 is established based on this correspondence, with one correspondence being ($U_i$, $C_j$, $R_j^i$). Amplitudes as shown in FIG. 3 and FIG. 4 indicate a magnitude of the vibration response.

Step S2: a real-time oil film clearance and a real-time vibration response are acquired. Determination is performed on the real-time vibration response. Under a condition that the real-time vibration response is smaller than a response threshold, adjustment is skipped. And under a condition that the real-time vibration response is greater than or equal to the response threshold, the real-time oil film clearance and the real-time vibration response are approximately matched with the mapping matrix to obtain a real-time unbalance. In this embodiment, a condition that a difference therebetween does not exceed 5% is deemed as approximate.

Step S3: based on the real-time unbalance and the mapping matrix, a preferred vibration response is obtained, and further a preferred oil film clearance is obtained.

In an embodiment, a plurality of initial vibration responses smaller than the response threshold are searched in the mapping matrix based on the real-time unbalance, and one of the plurality of initial vibration responses is randomly selected as the preferred vibration response.

Based on the real-time unbalance and the preferred vibration response, the preferred oil film clearance is searched in the mapping matrix.

Step S4: based on the preferred oil film clearance and the real-time oil film clearance, a clearance adjustment amount is obtained. A control signal is generated based on the clearance adjustment amount, and adjustment is performed based on the control signal.

Further, a difference between the preferred oil film clearance and the real-time oil film clearance is solved to obtain the clearance adjustment amount. A difference value between the clearance adjustment amount and a sensing value of a piezoelectric stack displacement sensor is taken as an input value of a PID controller to obtain an initial control signal. The initial control signal can be optimized based on a neural network or other processing resource to obtain the control signal. And an oil film damping device is driven to adjust the oil film clearance based on the control signal.

Figure 5:
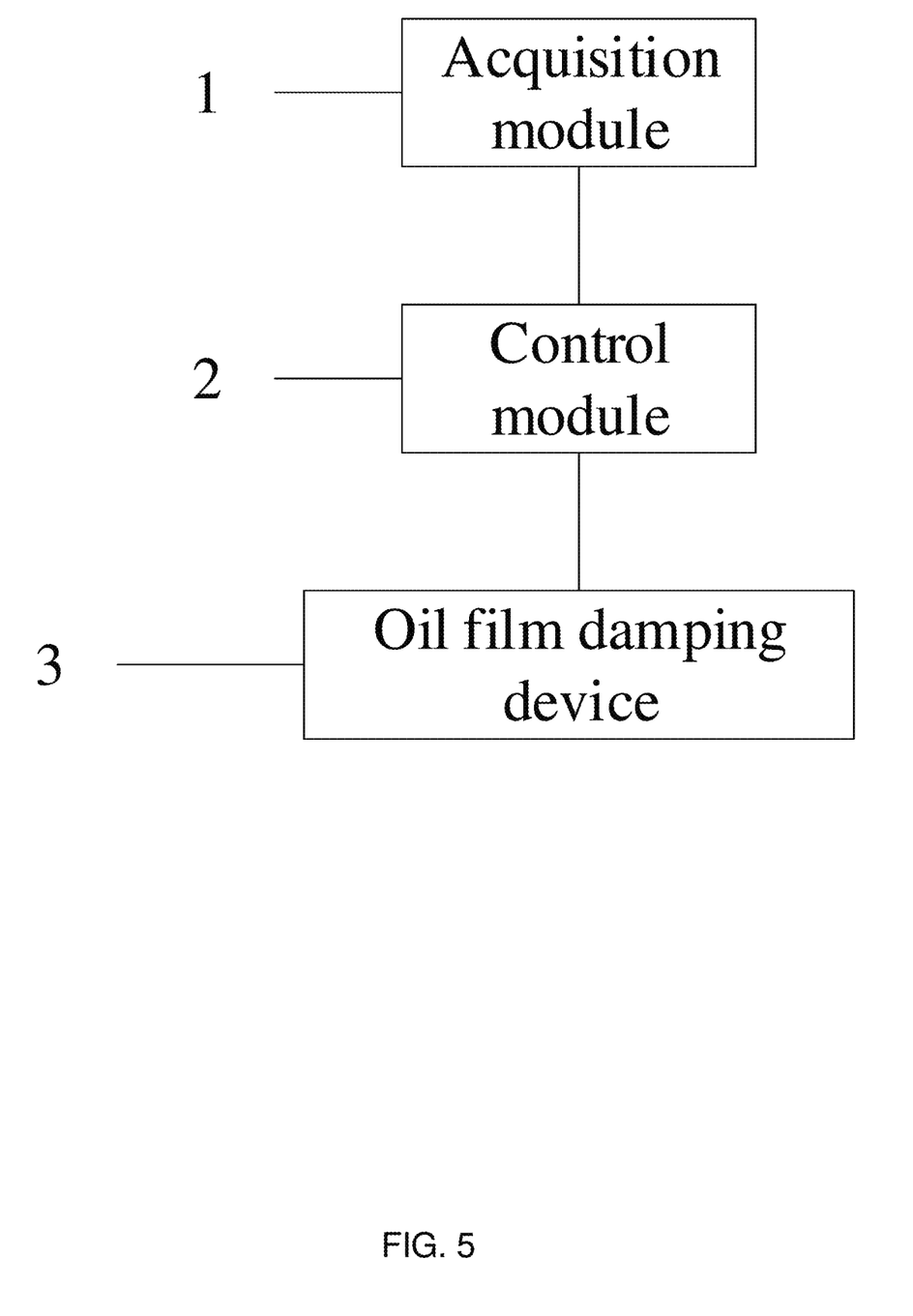
FIG. 5 is a structural diagram of a system for controlling the vibration of the rotor in the turboshaft engine according to the present disclosure.

FIG. 5 is a structural diagram illustrating a system for controlling the vibration of the rotor in the turboshaft engine according to the present disclosure. As shown in FIG. 5, the present disclosure provides a system for controlling the vibration of the rotor in the turboshaft engine, applicable to the method described above, where the system includes an acquisition module 1, a control module 2 and an oil film damping device 3.

The acquisition module 1 is configured to acquire a real-time oil film clearance and a real-time vibration response.

Specifically, the acquisition module 1 includes a vibration sensor and an eddy current sensor.

The vibration sensor is configured to acquire the real-time vibration response transmitted by a rotor-casing system via a casing.

The eddy current sensor is configured to acquire the real-time oil film clearance.

The control module 2 generates a control signal based on the real-time oil film clearance, the real-time vibration response, and a mapping matrix.

The control module 2 includes a neural network PID controller or other type of PID controller or another feedback-based controller.

The PID controller obtains an initial control signal based on the real-time oil film clearance and the real-time vibration response. Where the neural network optimizes the initial control signal to obtain the control signal.

The oil film damping device 3 is configured to conduct, based on the control signal, radial displacement to adjust an oil film clearance.

Figure 6:
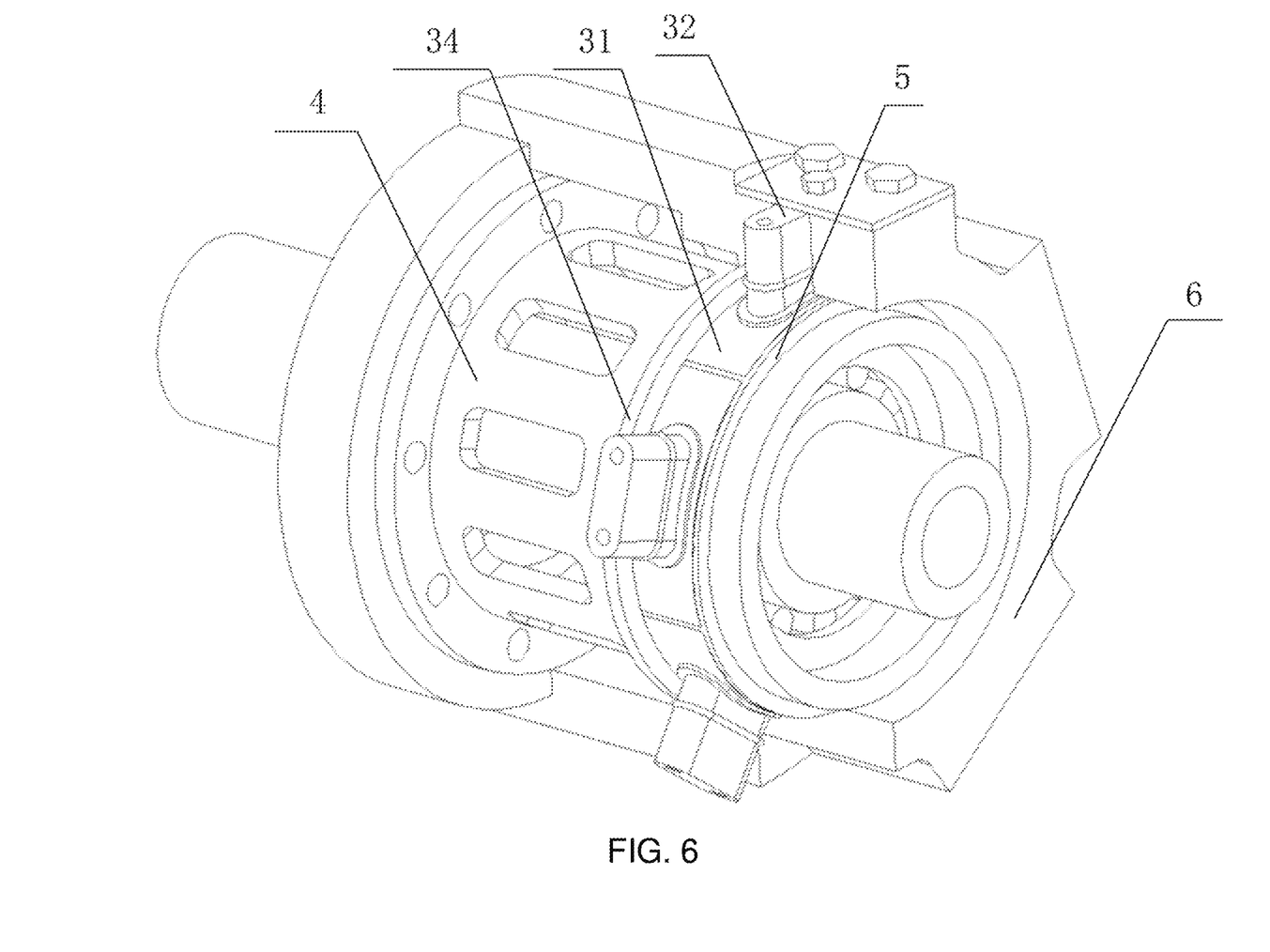
FIG. 6 is a structural diagram of an oil film damping device according to the present disclosure.
Figure 7:
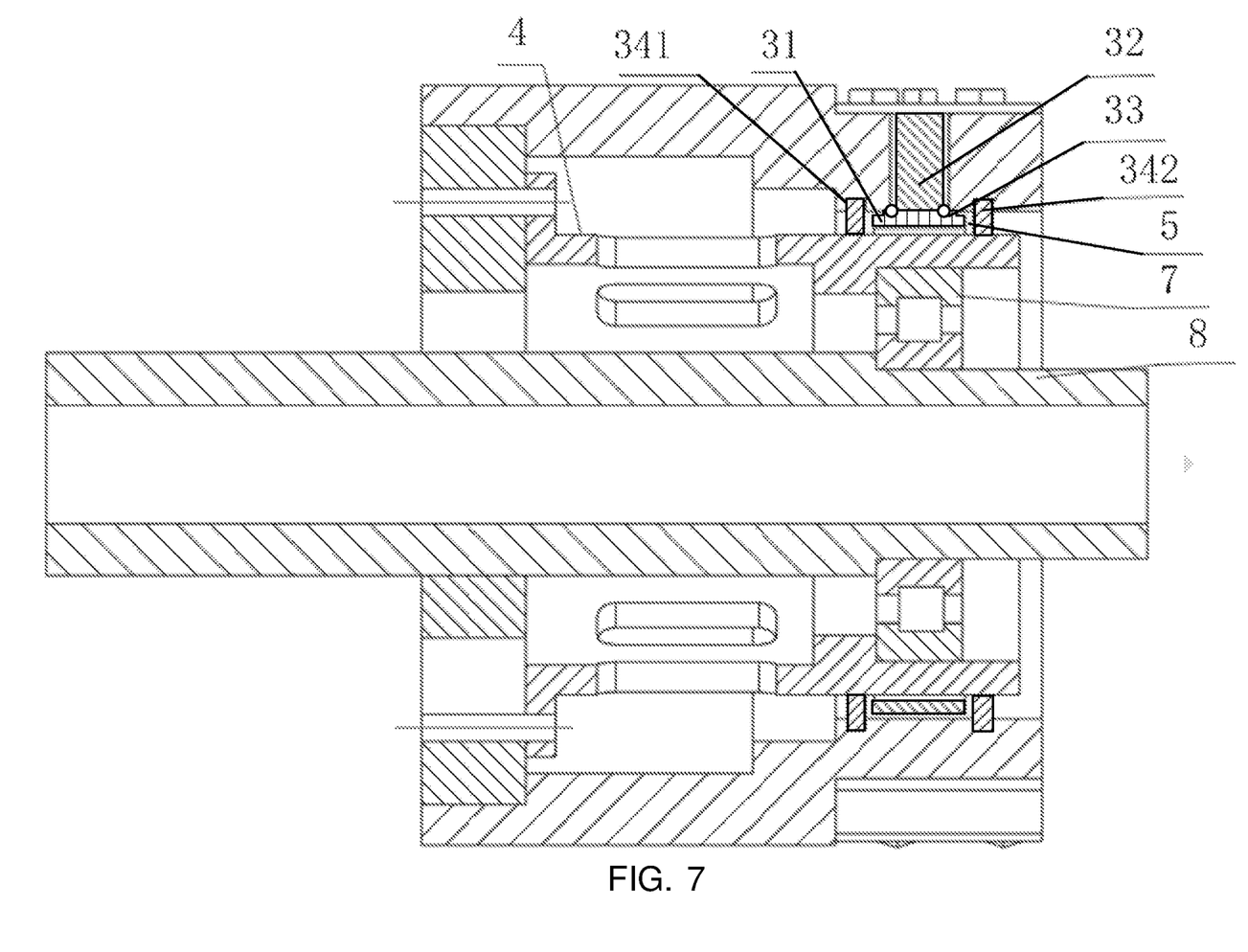
FIG. 7 is a sectional view of the oil film damping device according to the present disclosure.

As shown in FIG. 6 and FIG. 7, the oil film damping device 3 includes: a split bearing bush 31, a plurality of piezoelectric ceramic actuators 32, a plurality of O-shaped seal rings 33, and a stop end 34.

The rotor-casing system includes a squirrel cage 4, a rolling bearing 7, a bearing seat 6, and a rotary shaft 8.

The rolling bearing 7 is sleeved with the rotary shaft 8.

The squirrel cage 4 is connected with the rolling bearing 7. The split bearing bush 31 is arranged outside the squirrel cage 4, where an oil film 5 is formed between the split bearing bush 31 and the squirrel cage 4.

An end of each of the piezoelectric ceramic actuators 32 is connected with an outer wall of a bearing seat 6, and the other end of each of the piezoelectric ceramic actuators 32 is connected with the split bearing bush 31 via the O-shaped seal ring 33.

Each of the piezoelectric ceramic actuators 32 conducts radial motion based on the control signal to drive the split bearing bush 31 to conduct radial motion, thereby adjusting a clearance of the oil film 5.

The stop end 34, under a constraint condition that it does not limit the radial motion of the split bearing bush 31 and is as close to the split bearing bush 31 as possible, is arranged on both sides of the split bearing bush 31.

Specifically, the stop end 34 includes a left stop end 341 and a right stop end 342; where the left stop end 341 is arranged on a left side of the split bearing bush 31, and the right stop end 342 is arranged on a right side of the split bearing bush 31.

The piezoelectric ceramic actuators 32 each conduct stretching motion or retracting motion based on the control signal to drive the split bearing bush 31 to retract or stretch, thereby adjusting the clearance of the oil film 5.

Various embodiments of the present specification have been described in a progressive manner, each of which emphasizes the difference from others, and among which the same and similar parts can be referred to each other.

In this specification, the principles and implementations of the present disclosure have been described herein with specific examples. The above embodiments are described for a better understanding of the core concepts of the present disclosure. In addition, the detailed implementation and the application scope could be amended by those skilled in the art in accordance with the teachings of the present disclosure. In conclusion, the contents of the present description shall not be construed as limiting the present disclosure.

What is claimed is:

1. A method for controlling a vibration of a rotor in a turboshaft engine, comprising:
    establishing, based on a kinetic model for a rotor-casing system, a mapping matrix indicating a correspondence among an unbalance, an oil film clearance, and a vibration response;
    acquiring a real-time oil film clearance and a real-time vibration response; performing determination on the real-time vibration response, under a condition that the real-time vibration response is smaller than a response threshold, skipping adjustment; under a condition that the real-time vibration response is greater than or equal to the response threshold, approximately matching the real-time oil film clearance and the real-time vibration response with the mapping matrix to obtain a real-time unbalance;
    obtaining, based on the real-time unbalance and the mapping matrix, a preferred vibration response, and further obtaining a preferred oil film clearance; and
    obtaining, based on the preferred oil film clearance and the real-time oil film clearance, a clearance adjustment amount; and generating a control signal based on the clearance adjustment amount, and performing adjustment based on the control signal.

2. The method for controlling the vibration of the rotor in the turboshaft engine according to claim 1, wherein establishing, based on the kinetic model for the rotor-casing system, the mapping matrix indicating the correspondence among the unbalance, the oil film clearance, and the vibration response comprises:
    Establishing the kinetic model for the rotor-casing system;
    virtually embedding a plurality of unbalances in the kinetic model for the rotor-casing system;
    setting a plurality of oil film clearances under each of the unbalances; and
    performing a response analysis to obtain the mapping matrix.

3. The method for controlling the vibration of the rotor in the turboshaft engine according to claim 1, wherein obtaining, based on the real-time unbalance and the mapping matrix, the preferred vibration response, and further obtaining the preferred oil film clearance comprises:
    searching the mapping matrix for a plurality of initial vibration responses smaller than the response threshold based on the real-time unbalance, and randomly selecting one of the plurality of initial vibration responses as the preferred vibration response; and
    searching the mapping matrix based on the real-time unbalance and the preferred vibration response for the preferred oil film clearance.

4. The method for controlling the vibration of the rotor in the turboshaft engine according to claim 1, wherein obtaining, based on the preferred oil film clearance and the real-time oil film clearance, the clearance adjustment amount; and generating the control signal based on the clearance adjustment amount, and performing the adjustment based on the control signal comprises:
  solving a difference between the preferred oil film clearance and the real-time oil film clearance to obtain the clearance adjustment amount; and
  generating the control signal based on the clearance adjustment amount, and performing the adjustment based on the control signal.

5. The method for controlling the vibration of the rotor in the turboshaft engine according to claim 4, wherein generating the control signal based on the clearance adjustment amount, and performing the adjustment based on the control signal comprises:
  taking a difference value between the clearance adjustment amount and a sensing value of a piezoelectric stack displacement sensor as an input value of a PID controller to obtain an initial control signal;
  optimizing the initial control signal based on a neural network to obtain the control signal; and
  driving an oil film damping device to adjust the oil film clearance based on the control signal.

6. A system for controlling a vibration of a rotor in a turboshaft engine, applicable to a method for controlling the vibration of the rotor in the turboshaft engine, wherein the system comprises:
  an acquisition module configured to acquire a real-time oil film clearance and a real-time vibration response;
  a control module configured to generate a control signal based on the real-time oil film clearance, the real-time vibration response, and a mapping matrix; and
  an oil film damping device configured to conduct, based on the control signal, radial displacement to adjust an oil film clearance;
  wherein the method comprises:
  establishing, based on a kinetic model for a rotor-casing system, the mapping matrix indicating a correspondence among an unbalance, an oil film clearance, and a vibration response;
  acquiring the real-time oil film clearance and the real-time vibration response; performing determination on the real-time vibration response, under a condition that the real-time vibration response is smaller than a response threshold, skipping adjustment; under a condition that the real-time vibration response is greater than or equal to the response threshold, approximately matching the real-time oil film clearance and the real-time vibration response with the mapping matrix to obtain a real-time unbalance;
  obtaining, based on the real-time unbalance and the mapping matrix, a preferred vibration response, and further obtaining a preferred oil film clearance; and
  obtaining, based on the preferred oil film clearance and the real-time oil film clearance, a clearance adjustment amount; and generating the control signal based on the clearance adjustment amount, and performing adjustment based on the control signal.

7. The system for controlling the vibration of the rotor in the turboshaft engine according to claim 6, wherein the oil film damping device comprises:
  a split bearing bush arranged outside a squirrel cage, wherein the oil film clearance is formed between the split bearing bush and the squirrel cage; and
  a plurality of piezoelectric ceramic actuators, wherein an end of each piezoelectric ceramic actuator is connected with an outer wall of a bearing seat, and another end of the piezoelectric ceramic actuator is connected with the split bearing bush; and each of the piezoelectric ceramic actuators conducts radial motion based on the control signal to drive the split bearing bush to conduct radial motion, thereby adjusting the oil film clearance.

8. The system for controlling the vibration of the rotor in the turboshaft engine according to claim 7, wherein each of the piezoelectric ceramic actuators is connected with the split bearing bush via an O-shaped seal ring.

9. The system for controlling the vibration of the rotor in the turboshaft engine according to claim 7, wherein the squirrel cage is further provided with a stop end; and
  the stop end, under a constraint condition of not limiting the radial motion of the split bearing bush, is arranged on both sides of the split bearing bush.

10. The system for controlling the vibration of the rotor in the turboshaft engine according to claim 6, wherein establishing, based on the kinetic model for the rotor-casing system, the mapping matrix indicating the correspondence among the unbalance, the oil film clearance, and the vibration response comprises:
  establishing the kinetic model for the rotor-casing system;
  virtually embedding a plurality of unbalances in the kinetic model for the rotor-casing system, setting a plurality of oil film clearances under each of the unbalances, and performing a response analysis to obtain the mapping matrix.

11. The system for controlling the vibration of the rotor in the turboshaft engine according to claim 10, wherein the oil film damping device comprises:
  a split bearing bush arranged outside a squirrel cage, wherein the oil film clearance is formed between the split bearing bush and the squirrel cage; and
  a plurality of piezoelectric ceramic actuators, wherein an end of each piezoelectric ceramic actuator is connected with an outer wall of a bearing seat, and another end of the piezoelectric ceramic actuator is connected with the split bearing bush; and each of the piezoelectric ceramic actuators conducts radial motion based on the control signal to drive the split bearing bush to conduct radial motion, thereby adjusting the oil film clearance.

12. The system for controlling the vibration of the rotor in the turboshaft engine according to claim 11, wherein each of the piezoelectric ceramic actuators is connected with the split bearing bush via an O-shaped seal ring.

13. The system for controlling the vibration of the rotor in the turboshaft engine according to claim 11, wherein the squirrel cage is further provided with a stop end; and
  the stop end, under a constraint condition of not limiting the radial motion of the split bearing bush, is arranged on both sides of the split bearing bush.

14. The system for controlling the vibration of the rotor in the turboshaft engine according to claim 6, wherein obtaining, based on the real-time unbalance and the mapping matrix, the preferred vibration response, and further obtaining the preferred oil film clearance comprises:
  searching the mapping matrix for a plurality of initial vibration responses smaller than the response threshold based on the real-time unbalance, and randomly selecting one of the plurality of initial vibration responses as the preferred vibration response; and
  searching the mapping matrix based on the real-time unbalance and the preferred vibration response for the preferred oil film clearance.

15. The system for controlling the vibration of the rotor in the turboshaft engine according to claim 14, wherein the oil film damping device comprises:
- a split bearing bush arranged outside a squirrel cage, wherein the oil film clearance is formed between the split bearing bush and the squirrel cage; and
- a plurality of piezoelectric ceramic actuators, wherein an end of each piezoelectric ceramic actuator is connected with an outer wall of a bearing seat, and another end of the piezoelectric ceramic actuator is connected with the split bearing bush; and each of the piezoelectric ceramic actuators conducts radial motion based on the control signal to drive the split bearing bush to conduct radial motion, thereby adjusting the oil film clearance.

16. The system for controlling the vibration of the rotor in the turboshaft engine according to claim 15, wherein each of the piezoelectric ceramic actuators is connected with the split bearing bush via an O-shaped seal ring.

17. The system for controlling the vibration of the rotor in the turboshaft engine according to claim 15, wherein the squirrel cage is further provided with a stop end; and
- the stop end, under a constraint condition of not limiting the radial motion of the split bearing bush, is arranged on both sides of the split bearing bush.

18. The system for controlling the vibration of the rotor in the turboshaft engine according to claim 6, wherein obtaining, based on the preferred oil film clearance and the real-time oil film clearance, the clearance adjustment amount; and generating the control signal based on the clearance adjustment amount, and performing the adjustment based on the control signal comprises:
- solving a difference between the preferred oil film clearance and the real-time oil film clearance to obtain the clearance adjustment amount; and
- generating the control signal based on the clearance adjustment amount, and performing the adjustment based on the control signal.

19. The system for controlling the vibration of the rotor in the turboshaft engine according to claim 18, wherein the oil film damping device comprises:
- a split bearing bush arranged outside a squirrel cage, wherein the oil film clearance is formed between the split bearing bush and the squirrel cage; and
- a plurality of piezoelectric ceramic actuators, wherein an end of each piezoelectric ceramic actuator is connected with an outer wall of a bearing seat, and another end of the piezoelectric ceramic actuator is connected with the split bearing bush; and each of the piezoelectric ceramic actuators conducts radial motion based on the control signal to drive the split bearing bush to conduct radial motion, thereby adjusting the oil film clearance.

20. The system for controlling the vibration of the rotor in the turboshaft engine according to claim 19, wherein each of the piezoelectric ceramic actuators is connected with the split bearing bush via an O-shaped seal ring.

* * * * *